April 10, 1945.    M. SKOLNIK    2,373,270

TANK

Filed June 19, 1943

INVENTOR
Max Skolnik
BY  Evans + McCoy
ATTORNEYS

Patented Apr. 10, 1945

2,373,270

UNITED STATES PATENT OFFICE 2,373,270

TANK

Max Skolnik, Chicago, Ill.

Application June 19, 1943, Serial No. 491,539

9 Claims. (Cl. 119—72)

This invention relates to a tank for holding fluids such as water and the like. It particularly relates to a tank which is suitable for agricultural use, such as for the watering of stock and the like, and which does not utilize appreciable amounts of metals or other strategic materials.

It is an object of the present invention to provide a tank suitable for feeding stock and the like, which is lightweight, waterproof, unaffected by the elements and not readily impaired or ruptured by impact likely to be encountered.

It is another object of the present invention to provide a tank for holding or storing water, which tank is strong, relatively lightweight, and does not contain appreciable amounts of metal.

It is a further object of the present invention to provide a non-metallic tank which is protected from damage by horses, cattle and the like, but which is suitable for watering and feeding purposes, and which may be easily repaired.

Other objects will be apparent from the following description of the invention, as illustrated by the accompanying drawing, in which.

Figure 1:
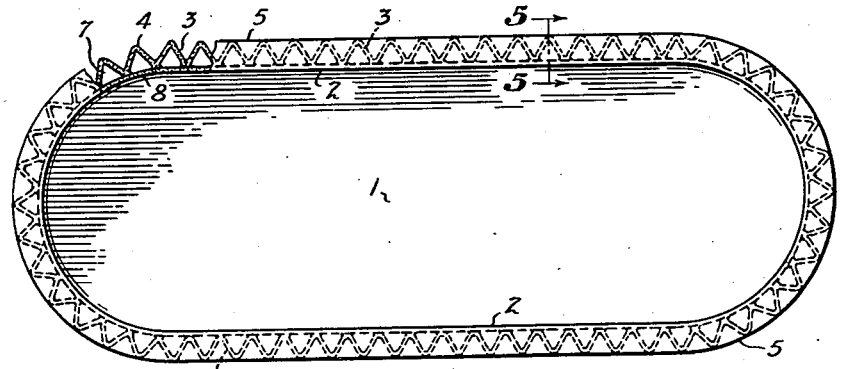
Figure 1 is a top plan view, with parts broken away, of a tank embodying the present invention.
Figure 2:
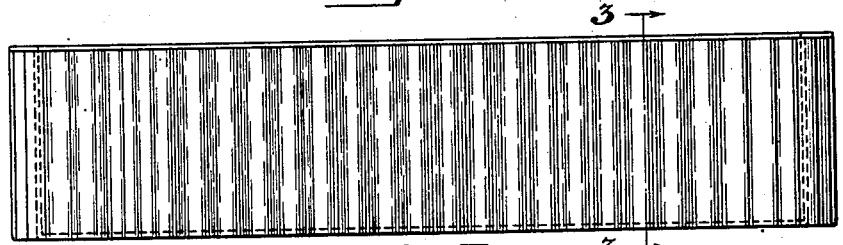
Fig. 2 is a side elevational view of the tank of Fig. 1.
Figure 3:
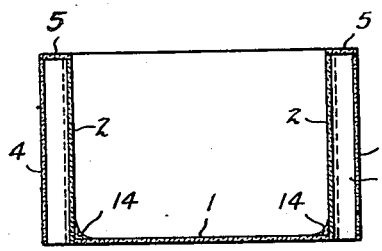
Fig. 3 is a sectional view on the line 3—3 of Fig. 2.
Figure 4:
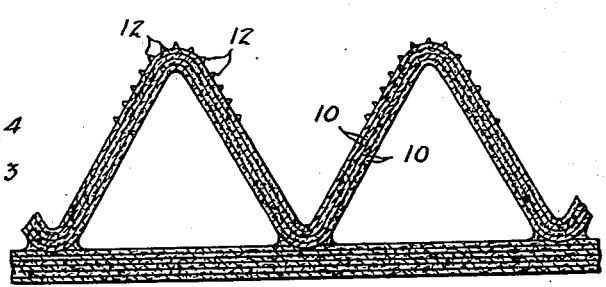
Fig. 4 is an enlarged sectional view through a portion of a side wall of the tank of Fig. 1.
Figure 5:
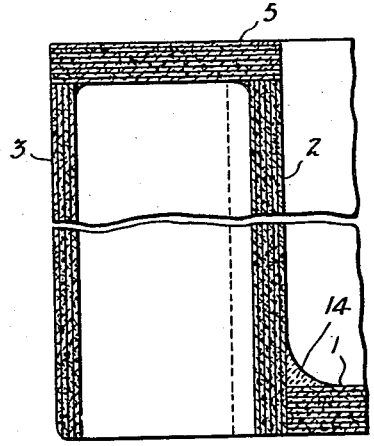
Fig. 5 is an enlarged sectional view, with portions removed, taken on the line 5—5 of Fig. 1.

The tanks embodying the present invention comprise a plurality of plies of pitch or bitumen-impregnated fibrous material, e. g., pitch-impregnated felt or felted paper bonded together by intervening layers of a strong water resistant hardened composition and suitably shaped to form elements capable of cooperating to retain fluids such as water. The hardened plastic material contains as essential ingredients a relatively high melting point bitumen or pitch and magnesium oxychloride cement. This magnesium oxychloride cement composition serves to cause formation of a strong bond between the finely divided pitch particles; and probably because of the highly exothermic reaction on setting of the cement, the magnesium oxychloride serves to soften or treat the finely divided pitch so that the particles of the pitch in turn serve to waterproof and render the magnesium cement water-resistant. The hard-setting exothermic cementitious composition bonds to asphalt-coated and bitumen-impregnated fibrous materials, which in turn act as a reinforcing agent and hot-forming aid, so that the laminated material becomes hard, tough, waterproof and fireproof.

Referring more particularly to the drawing, in which like parts are designated throughout the several views by like numerals of reference, my improved liquid retaining tanks have a main body portion which consists of a plurality of integrally connected plies sheeted essentially to form an upstanding wall 2 and a laminated bottom member 1 in cooperating relation therewith to form a liquid retaining space. A protective and reinforcing guard portion 3 is attached to and is preferably integral with the wall portion 2. It is also a plurality of integrally connected plies and has a corrugated shape. It preferably overlies substantially the entire outer periphery and entire area of the wall 2 so that the ridges 4 protect the entire upstanding wall portion from destructive contact by the stock, as well as from other destructive physical effects likely to be encountered in use. A flange 5 may, if desired, overlie the upper surface of the guard 3 to prevent extraneous matters from entering the spaces 7 between the apices of the corrugations and the wall 2 of the tank. The flange 5 which is preferably present may be integrally united both to the guards 3 and to the upper edge 8 of the wall 2.

The wall 2, which may be continuous with rounded end portions connected to relatively straight intermediate portions or of a generally elongated or elliptical shape, or it may consist of side and end wall portions connected together, is formed of a plurality of superimposed layers 10 of bitumen-impregnated felt material, e. g., felt paper impregnated by a pitch having a melting point of over 150° F. and preferably over 250° F. or 300° F. The layers 10 may be spirally wound and are bonded together through layers 11 of hardened, waterproof, cementitious composition containing substantial amounts of magnesium oxychloride cement and a bituminous material, such as a finely divided residue from the distillation or extraction of coal tar. Outer layers 11a of the hardened cement composition are disposed over the inner and outer surfaces of the outer layers or plies 10.

The corrugated guard 3 also contains a plurality of layers 10 of similarly impregnated paper adhered together by intervening layers of a water resistant magnesium cement composition. The outer magnesium oxychloride cement surface of the guard, however, is preferably stippled to provide a roughened surface having a plurality of pointed elements 12 thereon, which elements are of hardened magnesium oxychloride cement composition, and tend to keep cattle and the like from making undesirable contacts with the tank.

The bottom member 1 of the tank is preferably of relatively flat laminated construction and may consist of a layer of the impregnated sheet material bonded together by the waterproof magnesium cement composition, above set forth. The bottom 1 is integrally attached along its entire peripheral edges to the wall 2, near the lower peripheral edge thereof, through the hardened waterproof magnesium oxychloride cement contained within the fillets 14 which connect with the peripheral edge portion of said bottoms and the lower peripheral edge portion of the upstanding walls 2.

In the preparation of the tanks embodying the present invention, the felted material, e. g., felt, paper or other suitable sheeted fibrous material, may be impregnated by passing it through a bath of a molten pitch or bitumen which is normally solid and which preferably has a melting point of 300° F. or more. The outer surface of the pitch-impregnated paper is then preferably coated with a suitable thin layer 15 of a normally hard asphalt or bitumen which may be deposited by spraying a solution of asphalt, e. g. a solution of gilsonite, in volatile solvent on both of the surfaces of said fibrous material. A normally hard asphalt which softens between room temperature and say 250° F. permits the formation of a strong bond to magnesium oxychloride cement. The asphalt coated bitumen-impregnated fibrous sheet material is then coated with a warm, hardenable pitch composition containing substantial amounts of magnesium oxychloride cement to give the composition a hard-setting characteristic and to provide high strength and rigidity. The bitumen-impregnated sheet material which has been successively coated on both sides with a normally solid asphalt or bitumen, and with a thin layer—say a layer of the order of $\frac{1}{32}$ or $\frac{1}{16}$ inch in thickness—of the plastic hardenable magnesium oxychloride cement composition on either side thereof, may then be spirally wound about a suitable form to provide the desired number of laminations to form the wall portion 2 of the tank. The form is preferably one having curved end portions connected by relatively flat intermediate portions.

The bottom member may be formed from a flat laminated sheet prepared by plying up a plurality of layers of the bitumen-impregnated fibrous material containing the plastic magnesium oxychloride cement composition, above described, and cutting the panel to a shape suitable for cooperation with the wall portion 2 to form, after hardening of the cement in the fillets 14, a liquid retaining tank.

The guard 3 may be produced by corrugating a strip of laminated material prepared by superimposing a plurality of plies of the bitumen-impregnated material coated with the magnesium cement composition as above described, and corrugating the material by suitable means, such as a corrugating machine, while the magnesium oxychloride cement composition is still in the plastic state and while the pitch in the pitch-impregnated paper is still in the warm or non-fragile state. By simply cooling the composite structure so that the pitch in the impregnated fibrous material solidifies, the corrugated shape may be retained in the guard with the magnesium cement composition still in the plastic state. The guard is then applied against and in contact with the outer plastic surface of the wall portion 2, in which position the plastic surfaces 11a are allowed to harden and set to unite the tank in a unitary manner. The outer stippled coating on the guard may be prepared by well-known methods at any time before the outer cementitious coating thereon has hardened beyond the plastic state.

It will be seen that the corrugated guard 3 will prevent rupture of the bottom or wall portion of the tank, even though the tank be severely knocked, as for example, by the kicking of horses. If the guard 3 is ruptured, it will not cause loss of fluid from the tank and it may be readily repaired.

When it is desired to make the tank more resistant to shock and less brittle, it is desirable to make the bitumen-impregnated fibrous material in at least some of the plies or layers 10 and preferably in all of the plies 10 of sheets of fabric or felted paper impregnated with pitch or hard bitumen, and to adhere these thus impregnated sheets to an interposed layer of softer bitumen or asphalt.

Figures 6, 7:
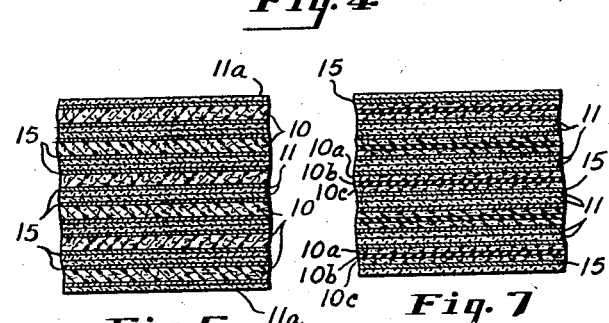
Fig. 6 is a highly enlarged view of a portion of the side wall of the tank embodying the invention to illustrate the laminated character thereof.
Fig. 7 is a similar view of a modified form of side wall portion.

Thus, referring to Fig. 7, the layers or plies 10 may be composed of layers 10a and 10c of pitch impregnated paper held together thru a contacting interposed layer of asphalt or lower melting bitumen 10b, the asphalt 10b being relatively soft or less brittle than the bitumen impregnating the sheets 10a and 10C.

Although two embodiments of the invention have been herein shown and described, it will be understood that numerous modifications of the construction shown may be resorted to without departing from the spirit of this invention as defined in the appended claims.

What I claim is:

1. A liquid-retaining tank comprising a plurality of superimposed layers of bitumen-impregnated fibrous sheet material united together by interposed layers of a hardened water-resistant composition containing magnesium oxychloride cement and being in the form of a continuous upstanding wall, and a laminated bottom member suitably attached to said upstanding wall around the lower edge portion thereof in a fluid-retaining relationship.

2. A liquid-retaining tank comprising a plurality of superimposed layers of bitumen-impregnated fibrous sheet material united by interposed layers of a hardened water-resistant composition containing magnesium oxychloride cement and being in the form of a continuous upstanding wall, a laminated bottom member suitably attached to said upstanding wall in a fluid-retaining relationship, and a rigid corrugated guard of non-metallic laminated material overlying the outer periphery of said wall.

3. A liquid-retaining tank comprising a plurality of layers of superimposed spirally wound bitumen-coated and impregnated fibrous sheet material, united by interposed layers of a hardened water-resistant composition containing magnesium oxychloride cement and being in a form of a continuous upstanding wall; and a laminated bottom member cemented along its entire peripheral edge portions to said wall and in fluid-retaining relationship thereto.

4. A liquid-retaining tank comprising a plurality of superimposed spirally disposed bitumen-coated and impregnated fibrous sheet material, united by interposed layers of a hardened water-resistant composition containing magnesium oxychloride cement and being in a form of a continuous upstanding wall which has a generally elongated shape, and a bottom member suitably attached to said upstanding wall along the lower portion thereof, and cooperating with said wall in forming a fluid-retaining receptacle.

5. A liquid retaining tank comprising a plurality of superimposed spirally wound bitumen-coated and impregnated fibrous sheet material, united by interposed layers of a hardened water-resistant composition containing magnesium oxychloride cement as the major hard setting binding ingredient and being in a form of a continuous upstanding wall, having a generally elongated shape, a water-impervious bottom member attached to said wall at the lower portion thereof, and in fluid-retaining relationship thereto; and a guard containing a plurality of superimposed layers of corrugated bitumen-impregnated sheet material integrally bonded over substantially their entire surfaces by hardened magnesium oxychloride cement, said guard overlying substantially the entire outer face of said wall.

6. A liquid retaining tank comprising a plurality of layers of a fibrous sheet material having a coating thereon of a normally solid bitumen and united by interposed layers of a hardened mixture containing magnesium oxychloride cement and finely divided bitumen, and being in the form of a continuous upstanding wall, and a laminated bottom member attached in fluid-retaining relationship to said wall near the lower peripheral edge thereof.

7. A liquid-retaining tank comprising a plurality of superimposed layers of bitumen-impregnated fibrous sheet material united by interposed layers of a hardened relatively strong water-resistant composition containing a mixture of magnesium oxychloride cement and a finely divided bituminous residue after removal of the more solid materials and oils from coal tar, said residue having a melting point at least in the region of 300° F. said layers being in the form of an upstanding wall having two rounded end portions connected by two relatively flat straight portions; a water resistant non-metallic bottom member attached in fluid retaining relationship along its entire edge portions to said wall, and a rigid corrugated guard overlying substantially the entire outer face of said upstanding wall, said guard comprising a plurality of layers of bitumen-impregnated fibrous material, integrally and substantially continuously bonded through intervening layers of water resistant hardened magnesium oxychloride cement composition, whereby reinforcement and protection of said upstanding wall by said guard is obtained.

8. A liquid-retaining tank comprising a plurality of superimposed spirally wound bitumen-coated and impregnated fibrous sheet material, united by interposed layers of a hardened water-resistant composition containing a suitable cement, and being in the form of a continuous upstanding wall having a generally elongated shape, a water-impervious bottom member attached to said wall at the lower portion thereof, and in fluid-retaining relationship thereto, and a guard containing a plurality of superimposed layers of corrugated bitumen-impregnated sheet material integrally bonded over substantially their entire surfaces by a hardened cement, said guard overlying substantially the entire outer face of said wall.

9. A liquid-retaining tank comprising an upstanding wall having a plurality of superimposed layers of bitumen-impregnated fibrous sheet material united by interposed layers of a hardened, relatively strong, water-resistant composition containing magnesium oxychloride cement, a water-resistant non-metallic bottom member attached in fluid-retaining relationship along its entire edge portions to said wall, and a rigid reinforcing and protecting member overlying the outer face of said upstanding wall, said protecting member being bonded to said wall through a water-resistant, hardened magnesium oxychloride cement composition.

MAX SKOLNIK.